(12) United States Patent
Lin

(10) Patent No.: US 11,258,550 B2
(45) Date of Patent: Feb. 22, 2022

(54) FEEDBACK INFORMATION SENDING OR RECEIVING METHODS, DEVICES AND SYSTEM

(71) Applicant: GUANGDONG OPPO MOBILE TELECOMMUNICATIONS CORP., LTD., Guangdong (CN)

(72) Inventor: Yanan Lin, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 466 days.

(21) Appl. No.: 16/332,328

(22) PCT Filed: Jan. 2, 2018

(86) PCT No.: PCT/CN2018/070066
§ 371 (c)(1),
(2) Date: Mar. 11, 2019

(87) PCT Pub. No.: WO2019/134071
PCT Pub. Date: Jul. 11, 2019

(65) Prior Publication Data
US 2021/0336730 A1 Oct. 28, 2021

(51) Int. Cl.
*H04L 1/18* (2006.01)
*H04L 1/06* (2006.01)
(Continued)

(52) U.S. Cl.
CPC .......... *H04L 1/1896* (2013.01); *H04L 1/0643* (2013.01); *H04L 1/1621* (2013.01); *H04W 28/06* (2013.01)

(58) Field of Classification Search
CPC ... H04L 1/1812; H04L 1/1896; H04L 1/1861; H04L 1/1822; H04L 1/1614
See application file for complete search history.

(56) References Cited

U.S. PATENT DOCUMENTS

| 2010/0215007 A1 | 8/2010 | Zhang et al. |
| 2018/0145797 A1* | 5/2018 | Yeo ........................ H04L 1/1896 |
| 2018/0270022 A1* | 9/2018 | Sun ........................ H04L 1/1896 |

FOREIGN PATENT DOCUMENTS

| CN | 101615986 A | 12/2009 |
| CN | 102255708 A | 11/2011 |

(Continued)

OTHER PUBLICATIONS

The first office action for the Chinese patent application No. 201880003298.8, dated Feb. 14, 2020.
"Code Block based HARQ for NR", Interdigital Inc, 3GPP Draft; R1-1709013, 3rd Generation Partnership Project(3GPP), Mobile Competence Centre, 1-4 Pages.
(Continued)

*Primary Examiner* — Jamal Javaid
(74) *Attorney, Agent, or Firm* — Ladas & Parry, LLP

(57) ABSTRACT

The embodiments of the application provide feedback information sending or receiving methods, devices and a system, and relate to the field of communication. The method includes that: a first bit length is determined, the first bit length being a number of bits for representing Transport Block (TB)-level feedback response information; a second bit length is determined, the second bit length being a number of bits for representing target TB indication information; feedback information is generated according to the first bit length and the second bit length, the feedback information including the TB-level feedback response information, the target TB indication information and code block group-level feedback response information; and the feedback information is sent.

19 Claims, 7 Drawing Sheets

(51) Int. Cl.
*H04L 1/16* (2006.01)
*H04W 28/06* (2009.01)

(56) References Cited

FOREIGN PATENT DOCUMENTS

| | | |
|---|---|---|
| CN | 102355341 A | 2/2012 |
| CN | 105024781 A | 11/2015 |
| CN | 105991247 A | 10/2016 |
| CN | 106888074 A | 6/2017 |
| CN | 107222298 A | 9/2017 |
| CN | 107359970 A | 11/2017 |
| CN | 107483160 A | 12/2017 |
| EP | 3416323 A1 | 12/2018 |
| WO | 2016126653 A1 | 8/2016 |

OTHER PUBLICATIONS

International Search Report and Written Opinion in international application No. PCT/CN2018/070066 , dated Apr. 27, 2018.
Extended European Search Report for EP patent application No. 18849434.8, dated Sep. 25, 2019.
Interdigital Inc: "Code Block based HARQ for NR", 3GPP Draft; R1-1709013, 3rd Generation Partnership Project(3GPP), Mobile Competence Centre; 650, Route Des Lucioles; F-06921 Sophia-Antipolis Cedex; France, vol. RAN WG1, No. Hangzhou; XP051274175.
NTT Docomo et al: "CBG based (re) transmission, preemption indication and subsequent transmission in NR", 3GPP Draft; R1-1708484, 3rd Generation Partnership Project(3GPP), Mobile Competence Centre; 650, Route Des Lucioles; F-06921 Sophia-Antipolis Cedex; France, vol. RAN WG1, No. Hangzhou; May 15, 2017-May 19, 2017 May 14, 2017(May 14, 2017), XP051273676.

\* cited by examiner

FEEDBACK INFORMATION SENDING OR RECEIVING METHODS, DEVICES AND SYSTEM

CROSS-REFERENCE TO RELATED APPLICATION

The present application is the U.S. national phase application of POT Application No. PCT/CN2018/070066 filed on Jan. 2, 2018, the disclosure of which is incorporated herein in its entirety by reference.

TECHNICAL FIELD

Embodiments of the application relate to the field of communications, and particularly to feedback information sending or receiving methods, devices and a system.

BACKGROUND

In a Long-Term Evolution (LTE) system, an eNodeB (eNB) adopts a Transport Block (TB) to send downlink data to User Equipment (UE), and the UE, after receiving the downlink data, sends feedback information to the eNB. The feedback information indicates either an Acknowledge (ACK) or a Non-Acknowledge (NACK).

When a data volume of a TB is relatively large, the eNB divides the TB into multiple relatively small code blocks, and each code block is coded and then sent to the UE respectively. The UE decodes each code block. In a case where all of the code blocks are successfully decoded, the UE feeds back an ACK corresponding to the TB to the eNB. In a case where at least one code block fails to be decoded, the UE feeds back a NACK corresponding to the TB to the eNB. The eNB, upon receiving the NACK corresponding to the TB, retransmits all of the code blocks corresponding to the TB to the UE.

A whole TB is required to be retransmitted when a certain code block fails to be decoded. Therefore, for the above-mentioned method, relatively more transmission resources are required to be occupied under a relatively poor transmission condition, and a performance requirement of a next-generation mobile communication system may not be met.

SUMMARY

The embodiments of the application provide feedback information sending or receiving methods, devices and a system, which may solve the problem that a whole TB is required to be retransmitted when a code block fails to be decoded.

According to a first embodiment of the application, a feedback information sending method is provided, which may include that:

a first bit length is determined, the first bit length being a number of bits for representing TB-level feedback response information;

a second bit length is determined; the second bit length being a number of bits for representing target TB indication information;

feedback information is generated according to the first bit length and the second bit length, the feedback information including the TB-level feedback response information, the target TB indication information and code block group-level feedback response information; and the feedback information is sent.

According to a second embodiment of the application, a feedback information receiving method is provided, which may include that:

feedback information sent by a terminal is received;

a first bit length is determined;

TB-level feedback response information is read from the feedback information according to the first bit length;

a second bit length is determined;

target TB indication information is read from the feedback information according to the second bit length; and at least one target TB is determined according to the target TB indication information, and code block group-level feedback response information of the at least one target TB is read from the feedback information.

According to a third embodiment of the application, a feedback information sending device is provided, which may include:

a processing module, configured to determine a first bit length, the first bit length being a number of bits for representing TB-level feedback response information.

the processing module being configured to determine a second bit length, the second bit length being a number of bits for representing target TB indication information, and the processing module being configured to generate feedback information according to the first bit length and the second bit length, the feedback information including the TB-level feedback response information, the target TB indication information and code block group-level feedback response information; and a sending module, configured to send the feedback information.

According to a fourth embodiment of the application, a feedback information receiving device is provided, which may include:

a receiving module, configured to receive feedback information; and a processing module, configured to determine a first bit length, the processing module being configured to read TB-level feedback response information from the feedback information according to the first bit length, the processing module being configured to determine a second bit length, the processing module being configured to read target TB indication information from the feedback information according to the second bit length, and the processing module being configured to determine at least one target TB according to the target TB indication information and read code block group-level feedback response information of the at least one target TB from the feedback information.

According to a fifth embodiment of the application, a terminal is provided, which may include a processor and a memory, the memory storing at least one instruction and the at least one instruction being configured to be executed by the processor to implement the feedback information sending method of the first embodiment.

According to a sixth embodiment of the application, an access network device is provided, which may include a processor and a memory, the memory storing at least one instruction and the at least one instruction being configured to be executed by the processor to implement the feedback information receiving method of the second embodiment.

According to a seventh embodiment of the application, a computer-readable storage medium is provided, which may store at least one instruction, the at least one instruction being configured to be executed by a processor to implement the feedback information sending method of the first embodiment.

According to an eighth embodiment of the application, a computer-readable storage medium is provided, which may store at least one instruction, the at least one instruction being configured to be executed by a processor to implement the feedback information receiving method of the second embodiment.

According to a ninth embodiment of the application, a communication system is provided; which may include a terminal and an access network device, wherein the terminal may be the terminal of the fifth embodiment, and the access network device may be the access network device of the sixth embodiment.

The technical solutions provided in the embodiments of the application have the following beneficial effects.

The first bit length corresponding to the TB-level feedback response information and the second bit length of the target TB indication information are determined, the feedback information including the TB-level feedback response information; the target TB indication information and the code block group-level feedback response information is generated, and the feedback information is sent to the access network device. By adopting the solution, the access network device is enabled to retransmit a code block which fails to be received according to the feedback information, and is not required to retransmit the whole TB. Therefore, occupied time-frequency resources are reduced, and downlink data transmission efficiency is improved.

BRIEF DESCRIPTION OF THE DRAWINGS

In order to describe the technical solutions in the embodiments of the application more clearly, the drawings required to be used for descriptions about the embodiments will be simply introduced below. It is apparent that the drawings described below are only some embodiments of the application. Those of ordinary skill in the art may further obtain other drawings according to these drawings without creative work.

DETAILED DESCRIPTION OF THE EMBODIMENTS

In order to make the purpose, technical solutions and advantages of the application clearer, implementation modes of the application will further be described below in combination with the drawings in detail.

"Module" mentioned in the invention usually refers to a program or instruction stored in a memory and capable of realizing some functions. "Unit" mentioned in the invention usually refers to a functional structure which is logically divided, and the "unit" may be implemented by pure hardware or implemented by a combination of software and hardware.

"Multiple" mentioned in the invention refers to two or more than two. "And/or" describes an association relationship between associated objects and represents that three relationships may exist. For example, A and/or B may represent three conditions: i.e., independent existence of A, existence of both A and B and independent existence of B. Character "I" in the invention usually represents that previous and next associated objects form an "or" relationship. "First", "second" and similar terms used in the specification and claims of the application do not represent any sequence, number or importance and are only adopted to distinguish different components.

Figure 1:
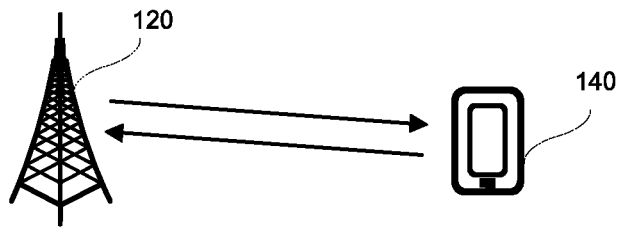
FIG. 1 is a structure diagram of a communication system according to an exemplary embodiment of the application.

Referring to FIG. 1, a structure diagram of a mobile communication system according to an embodiment of the application is illustrated. The mobile communication system may be a 5th-Generation (5G) system, also called a New Radio (NR) system. The mobile communication system includes an access network device 120 and a terminal 140.

The access network device 120 may be a base station. For example, the base station may be a gNB adopting a central distributed architecture in the 5G system. The access network device 120 adopting the central distributed architecture usually includes a Central Unit (CU) and at least two Distributed Units (DUs). Protocol stacks of a Packet Data Convergence Protocol (PDCP) layer, a Radio Link Control (RLC) layer and a Media Access Control (MAC) layer are set in the CU. A protocol stack of a Physical (PHY) layer is set in the DUs. A specific implementation manner for the access network device 120 is not limited in the embodiment of the application. In at least one exemplary implementation, the access network device may further include a Home Evolved Node B (HeNB), a relay, a Pico and the like. The access network device 120 may also be called a network-side device.

The access network device 120 establishes a wireless connection with the terminal 140 through a wireless air interface. In at least one exemplary implementation, the wireless air interface is a 5G-standard-based wireless air interface. For example, the wireless air interface is NR. Or, the wireless air interface may also be a wireless air interface based on a next-generation mobile communication network technology standard of 5G.

The terminal 140 may refer to a device providing voice and/or data connectivity for a user. The terminal may communicate with one or more core networks through a Radio Access Network (RAN). The terminal 140 may be a mobile terminal, for example, a mobile phone (or called a "cellular" phone), and a computer with a mobile terminal.

The mobile communication system shown in FIG. 1 may include multiple access network devices 120 and/or multiple terminals 140. FIG. 1 illustrates one access network device 120 and one terminal 140 for exemplary description. However, there are no limits made thereto in the embodiment.

The access network device adopts a downlink channel to send downlink data to the terminal. The downlink data may include m TBs, m being a positive integer. Each TB includes one or more code block groups. The terminal, after receiving the m TBs, decodes each code block in the m TBs and generates feedback information for the m TBs according to a decoding result.

In the embodiments of the application, the feedback information includes TB-level feedback response information and code block group-level feedback response information. The TB-level feedback response information is used for indicating whether the TB is successfully received or not, and the code block group-level feedback response information is configured to, when the TB fails to be received, indicate whether each code block in the TB is successfully received or not.

Figure 2:
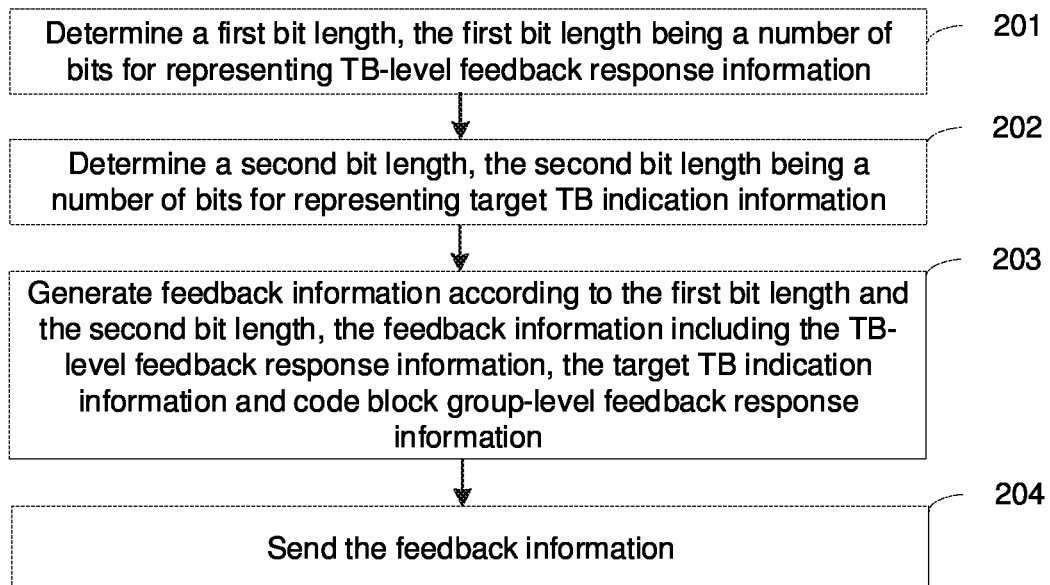
FIG. 2 is a flowchart of a feedback information sending method according to an exemplary embodiment of the application.

Referring to FIG. 2, a flowchart of a feedback information sending method according to an exemplary embodiment of the application is illustrated. Descriptions will be made in the embodiment with application of the method to a terminal shown in FIG. 1 as an example. The method includes the following operations shown in blocks 201 to 204 of FIG. 2.

In block 201, a first bit length is determined, the first bit length being a number of bits for representing TB-level feedback response information.

The terminal, after receiving m TBs in a Hybrid Automatic Repeat-reQuest (HARQ) process, determines the first bit length according to the number m of the TBs transmitted this time, the first bit length being a bit length of the TB-level feedback response information.

Feedback response information for each TB usually occupies one bit, and the first bit length is equal to the number m of the TBs. In at least one exemplary implementation, the feedback response information includes an ACK and a NACK. The ACK represents that the TB is successfully received, and is represented by one bit whose value is 1. The NACK represents that at least one code block in the TB fails to be received, and is represented by one bit whose value is 0.

In block 202, a second bit length is determined, the second bit length being a number of bits for representing target TB indication information.

In at least one exemplary implementation, the above mentioned target TB is at least one TB corresponding to code block group-level feedback response information. When a TB fails to be received, the terminal is required to feed back code block group-level feedback response information for the TB failed to be received.

Since a total bit length which may be used for feedback information is limited, the terminal may generate the code block group-level feedback response information for all of or part of the TBs failed to be received.

The above mentioned target TB is at least one TB corresponding to the code block group-level feedback response information. In a case where the TB-level feedback response information includes NACKs for n TBs, the above mentioned target TB is at least one TB in the n TBs.

The target TB indication information is used for indicating at least one target TB corresponding to the code block group-level feedback response information. In at least one exemplary implementation, the target TB indication information indicates the at least one target TB in the n TBs in a bitmap manner. The n TBs are TBs corresponding to the NACKs in the TB-level feedback response information.

In block 203, feedback information is generated according to the first bit length and the second bit length, the feedback information including the TB-level feedback response information, the target TB indication information and code block group-level feedback response information.

In at least one exemplary implementation, the terminal generates the TB-level feedback response information according to the first bit length, generates the target TB indication information according to the second bit length and generates the code block group-level feedback response information for at least one target TB according to the target TB indication information. Then, the terminal packs the TB-level feedback response information, the target TB indication information and the code block group-level feedback response information into the feedback information.

Figure 3:
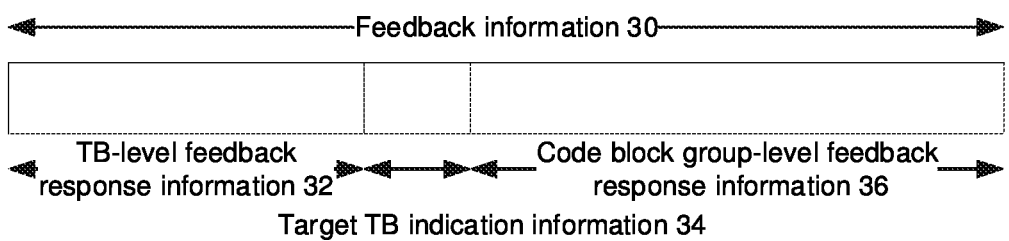
FIG. 3 is a structure diagram of feedback information according to an exemplary embodiment of the application.

Referring to FIG. 3, the feedback information 30 includes three parts, i.e., the TB-level feedback response information 32, the target TB indication information 34 and the code block group-level feedback response information 36.

In block 204, the feedback information is sent.

The terminal sends the feedback information to an access network device. The access network device, after receiving the feedback information, can retransmit only a code block failed to be received according to the TB-level feedback response information and the code block group-level feedback response information.

From the above, according to the method provided in the embodiment, the first bit length corresponding to the TB-level feedback response information and the second bit length of the target TB indication information are determined, the feedback information including the TB-level feedback response information, the target TB indication information and the code block group-level feedback response information is generated, and the feedback information is sent to the access network device. By adopting the solution, the access network device is enabled to retransmit a code block which fails to be received according to the feedback information, and is not required to retransmit the whole TB. Therefore, occupied time-frequency resources are reduced, and downlink data transmission efficiency is improved.

There are at least three possible implementation modes for the operation in block 202.

First, the second bit length is determined according to the first bit length.

In an embodiment, the terminal determines that the second bit length is equal to a first numerical value, the first numerical value being $\lceil \log_2 N \rceil$ or $\lfloor \log_2 N \rfloor$ or $\lceil \beta \cdot N \rceil$ or $\lfloor \beta \cdot N \rfloor$, $\lceil \ \rceil$ being a rounding-up signal and $\lfloor \ \rfloor$ being a rounding-down signal, where $\beta$ is a positive value less than 1 and N is the first bit length.

For example, in a case where the first bit length is 10 bits and the first numerical value is equal to $\lceil \log_2 10 \rceil = 4$, the terminal determines that the second bit length is equal to 4. For another example, the first bit length is 10 bits, $\beta = 0.2$ and the first numerical value is equal to $\lceil 0.1 * 10 \rceil = 2$.

In another embodiment, the terminal determines that the second bit length is equal to a smaller value in the first numerical value and a first threshold value. The first threshold value may be pre-configured or pre-determined.

For example, in a case where the first bit length is 10 bits, the first numerical value is equal to $\lceil \log_2 10 \rceil = 4$ and the first threshold value is $N_1=2$, the second bit length is set to be equal to $\min(\lceil \log_2 N \rceil, N_1)=2$.

According to the method provided in the implementation mode, the second bit length may be determined according to the first bit length of the TB-level feedback response information to make the first bit length form a positive correlation with the second bit length. The implementation mode may be applied to a communication scenario with relatively more time-frequency resources transmitting the feedback information.

Second, the second bit length is determined according to the number of NACKs in the TB-level feedback response information.

In an embodiment, the terminal determines that the second bit length is equal to a second numerical value, the second numerical value being the number of the NACKs in the TB-level feedback response information.

For example, in a case where the first bit length is 10 bits, feedback response information for four TBs is NACKs and the second numerical value is equal to 4, the terminal sets that the second bit length is 4.

In another embodiment, the terminal determines that the second bit length is equal to a smaller value in the second numerical value and a second threshold value. The second threshold value may be pre-configured or pre-determined.

For example, in a case where the first bit length is 10 bits, the feedback response information for four TBs is NACKs, the second numerical value is equal to 4 and the second threshold value is $N_2=2$, the second bit length is determined to be $\min(4, N_2)=2$.

According to the method provided in the implementation mode, the second bit length may be determined according to a number of NACKs in the TB-level feedback response information to make the second bit length form a positive correlation with the number of TBs failed to be received. When the number of the TBs failed to be received is relatively large, the second bit length may be increased to transmit feedback response information for more target TBs.

Third, the second bit length is determined according to the first bit length and the number of the NACKs in the TB-level feedback response information.

In an embodiment, the terminal determines that the second bit length is equal to a smaller value in a third numerical value and a second numerical value. Herein, the third numerical value is $\lceil \log_2 N \rceil$ or $\lfloor \log_2 N \rfloor$ or $\lceil \beta \cdot N \rceil$ or $\lfloor \beta \cdot N \rfloor$, where $\beta$ is a positive value less than 1, N is the first bit length and the second numerical value is the number of the NACKs in the TB-level feedback response information.

For example, in a case where the first bit length is 10 bits, the third numerical value is equal to $\lceil \log_2 10 \rceil = 4$, the number of the NACKs in the TB-level feedback response information is 4 and the second numerical value is also 4, the second bit length is equal to $\min(\lceil \log_2 10 \rceil, 4)=4$.

In another embodiment, the terminal determines that the second bit length is equal to a smaller value in the third numerical value and a third threshold value. The third threshold value may be pre-configured or pre-determined.

For example, in a case where the first bit length is 10 bits, the third numerical value is equal to $\lceil \log_2 10 \rceil = 4$ and the third threshold value is $N_3=2$, the second bit length is determined to be equal to $\min(\lceil \log_2 10 \rceil, N_3)=2$.

According to the method provided in the implementation mode, the second bit length may be determined in combination with the first bit length and the number of the NACKs in the TB-level feedback response information, so that the second bit length can be controlled not to be too large, and occupation of too many uplink transmission resources for the feedback information is avoided.

In an exemplary embodiment based on FIG. 1, when the second bit length is less than or equal to the number of the NACKs in the TB-level feedback response information, the target TB indication information is used for indicating that first P TBs or last P TBs corresponding to the NACKs in the TB-level feedback response information are target TBs. Herein, P is the second bit length.

For example, when the TBs include TB1 to TB10, the TB-level feedback response information is $\{ACK_{TB1}, ACK_{TB2}, ACK_{TB3}, ACK_{TB4}, NACK_{TB5}, NACK_{TB6}, NACK_{TB7}, NACK_{TB8}, ACK_{TB9}, ACK_{TB10}\}$ and the second bit length is 2, the target TB indication information is used for indicating that first two TBs, i.e., TB5 and TB6 corresponding to the NACKs are target TBs, that is, the feedback information contains code block group-level feedback response information for TB5 and TB6.

For another example, when the TBs include TB1 to TB8, the TB-level feedback response information is $\{ACK_{TB1}, ACK_{TB2}, ACK_{TB3}, ACK_{TB4}, NACK_{TB5}, NACK_{TB6}, NACK_{TB7}, NACK_{TB8}\}$ and the second bit length is 3, the target TB indication information is used for indicating that last three TBs, i.e., TB6, TB7 and TB8 corresponding to the NACKs are target TBs, that is, the feedback information contains code block group-level feedback response information for TB6, TB7 and TB8.

In an exemplary embodiment based on FIG. 1, when the second bit length is larger than the number of the NACKs in the TB-level feedback response information, first Q bits in the target TB indication information are used for indicating that TBs corresponding to the NACKs in the TB-level feedback response information are target TBs. Herein, Q is the number of the NACKs in the TB-level feedback response information.

For example, when the TBs include TB1 to TB10, the TB-level feedback response information is $\{ACK_{TB1}, ACK_{TB2}, ACK_{TB3}, ACK_{TB2}, NACK_{TB5}, NACK_{TB6}, ACK_{TB7}, ACK_{TB}, ACK_{TB9}, ACK_{TB10}\}$ and the second bit length is 4, first two bits in four bits of the target TB indication information are used for indicating TB5 and TB6 corresponding to the NACKs are target TBs, that is, the feedback information contains the code block group-level feedback response information for TB5 and TB6.

According to the method provided in the implementation mode, normal feedback may be ensured when the second bit length is the same as or different from the number of the NACKs in the TB-level feedback response information, so that applicability of the technical solution in the implementation mode to different scenarios is improved.

Figure 4:
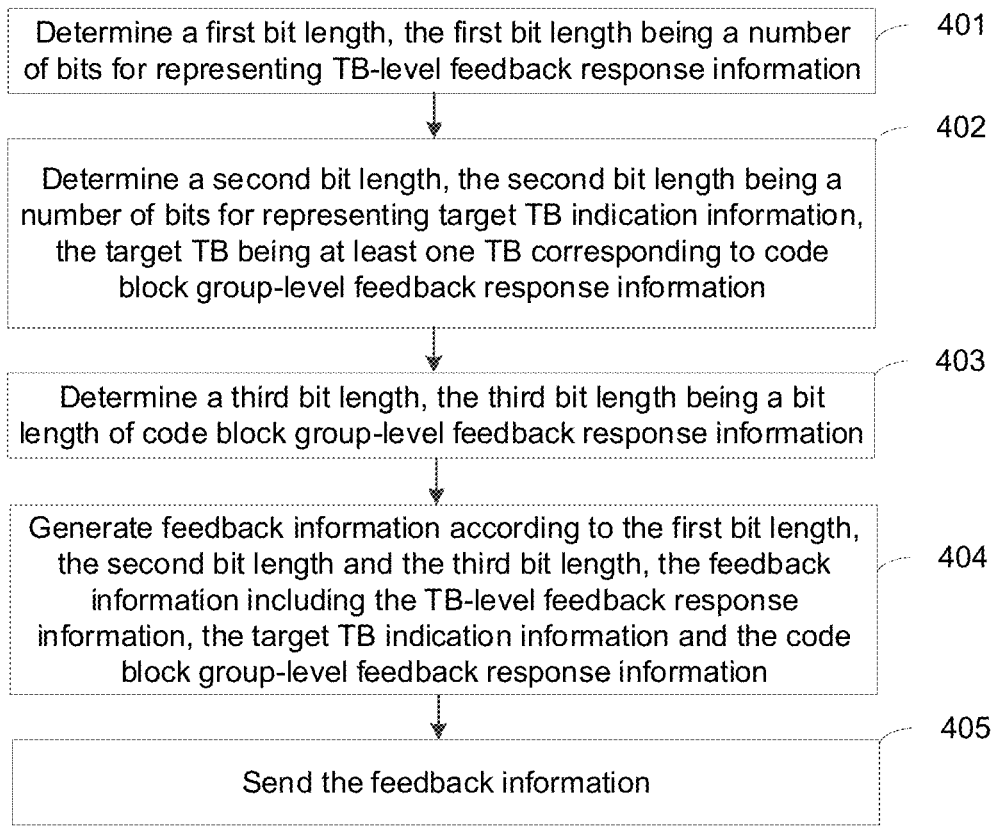
FIG. 4 is a flowchart of a feedback information sending method according to another exemplary embodiment of the application.

Referring to FIG. 4, a flowchart of a feedback information sending method according to another exemplary embodiment of the application is illustrated. Descriptions will be made in the embodiment with application of the method to a terminal shown in FIG. 1 as an example. The method includes the following operations shown in blocks 401 to 405 of FIG. 4.

In block 401, a first bit length is determined, the first bit length being a number of bits for representing TB-level feedback response information.

The terminal, after receiving m TBs in a Hybrid Automatic Repeat-reQuest (HARQ) process, determines the first bit length according to the number m of the TBs transmitted this time, the first bit length being a bit length of the TB-level feedback response information.

Feedback response information for each TB usually occupies one bit, and the first bit length is equal to the number m of the TBs. In at least one exemplary implementation, the feedback response information includes an ACK and a NACK. The ACK represents that the TB is successfully received, and is represented by one bit whose value is 1. The NACK represents that at least one code block in the TB fails to be received, and is represented by one bit whose value is 0.

In at least one exemplary implementation, the terminal generates the TB-level feedback response information according to the first bit length and a receiving state of each TB.

In block 402, a second bit length is determined, the second bit length being a number of bits for representing target TB indication information. The above mentioned target TB is at least one TB corresponding to code block group-level feedback response information.

For a successfully received TB, the terminal is not required to feed back code block group-level feedback response information. For a TB which fails to be received, the terminal is required to feed back code block group-level feedback response information.

Since a total bit length which may be used for feedback information is limited, the terminal may generate the code block group-level feedback response information for all of or part of the TBs failed to be received.

The at least one target TB is at least one TB corresponding to the code block group-level feedback response information. In a case where the TB-level feedback response information includes NACKs for n TBs, the at least one target TB is at least one TB in the n TBs.

The target TB indication information is used for indicating at least one target TB for which the code block group-level feedback response information is fed back. In at least one exemplary implementation, the target TB indication information indicates the at least one target TB in the n TBs in a bitmap manner. The n TBs are TBs corresponding to the NACKs in the TB-level feedback response information.

In at least one exemplary implementation, the terminal generates the target TB indication information according to the second bit length.

In block 403, a third bit length is determined, the third bit length being a bit length of code block group-level feedback response information.

The code block group-level feedback response information is code block group-level feedback response information for at least one target TB. There is one or more target TBs.

In at least one exemplary implementation, the terminal generates the code block group-level feedback response information according to the third bit length.

In block 404, feedback information is generated according to the first bit length, the second bit length and the third bit length, the feedback information including the TB-level feedback response information, the target TB indication information and the code block group-level feedback response information.

In at least one exemplary implementation, the terminal generates the TB-level feedback response information according to the first bit length, generates the target TB indication information according to the second bit length and generates the code block group-level feedback response information for the at least one target TB according to the third bit length and the target TB indication information. Then, the terminal packs the TB-level feedback response information, the target TB indication information and the code block group-level feedback response information into the feedback information.

In block 405, the feedback information is sent.

The terminal sends the feedback information to an access network device. The access network device, after receiving the feedback information, can retransmit only a code block failed to be received according to the TB-level feedback response information and the code block group-level feedback response information.

From the above, according to the method provided in the embodiment, the first bit length corresponding to the TB-level feedback response information and the second bit length of the target TB indication information are determined, the feedback information including the TB-level feedback response information, the target TB indication information and the code block group-level feedback response information is generated, and the feedback information is sent to the access network device. By adopting the solution, the access network device is enabled to retransmit a code block which fails to be received according to the feedback information, and is not required to retransmit the whole TB. Therefore, occupied time-frequency resources are reduced, and downlink data transmission efficiency is improved.

According to the method provided in the embodiment, the third bit length is further determined to implement correct generation and sending of the code block group-level feedback response information, so that the access network device can retransmit only the code block which fails to be received according to the feedback information.

There are at least two possible implementation modes for the operation in block 403.

First, the terminal determines the third bit length according to a total bit length of the feedback information.

In at least one exemplary implementation, the terminal, after determining the first bit length and the second bit length, calculates a remaining bit length according to the total bit length of the feedback information and determines the remaining bit length as the third bit length.

The total bit length of the feedback information is preset, or, the total bit length of the feedback information is configured by the access network device.

In an embodiment, the terminal receives downlink control signaling, determines the total bit length of the feedback information according to the downlink control signaling and determines the third bit length according to the total bit length, the first bit length and the second bit length. In another embodiment, the terminal receives high-layer signaling, determines the total bit length of the feedback information according to the high-layer signaling and determines the third bit length according to the total bit length, the first bit length and the second bit length. The high-layer signaling refers to signaling sent by a core network device located above the access network device.

For example, in a case where the total bit length of the feedback information is 22, the first bit length is 10 and the second bit length is 2, the third bit length is 22−10−2=10.

Second, the terminal receives configuration signaling sent by a network-side device, and determines the third bit length according to the configuration signaling.

In at least one exemplary implementation, the network-side device sends the configuration signaling to the terminal, the configuration signaling being used for configuring the third bit length, and the terminal determines the third bit length according to the configuration signaling.

According to the method provided in the embodiment, the situation that a length of the code block group-level feedback response information is too large and exceeds the total bit length of the feedback information may be avoided. The third bit length occupied by the code block group-level feedback response information may be reasonably controlled according to the total bit length occupied by the feedback information, and transmission resources occupied by the feedback information are saved.

In an exemplary embodiment based on FIG. 4, in a feedback information generation process of the terminal, the terminal generates $T_i$-bit feedback response information for each target TB, $T_i$ being greater than or equal to 1, $0 \leq i \leq X-1$ and X being a number of the at least one target TB.

In at least one exemplary implementation, $T_i$ is equal to a maximum number of code block groups in one TB; or, $T_i$ is equal to a number of code block groups in the ith target TB; or, $T_i$ is equal to a third numerical value, the third numerical value being determined according to the third bit length.

For the situation that $T_i$ is equal to the third numerical value, there are at least two exemplary implementation modes for determination of Ti.

First, it is set that $$T_X = Y - \sum_{i=1}^{X-1} T_i,$$

where Tx is a bit length corresponding to an Xth target TB, and Y is the third bit length. In at least one exemplary implementation, when $1 \leq i \leq x-1$, $T_i$ is a number of code block groups in the ith target TB. In a case where Tx is larger than the number of code block groups in the Xth target TB, the terminal may fill last unused bits with 1 or 0.

For example, in a case where the third bit length is 18, there are four target TBs, there are four code block groups in each target TB, $T_1=4$, $T_2=4$, $T_3=4$ and $T_4=18-(4+4+4)=6$, last two bits of $T_4$ are filled with 0.

In a schematic example, the access network device makes such a configuration that the total bit length of the feedback information is 22 and each TB maximally includes eight code block groups for the terminal.

The terminal determines that the first bit length of the TB-level feedback response information is 10, and the TB-level feedback response information is:

{$ACK_{TB1}$, $ACK_{TB2}$, $NACK_{TB3}$, $NACK_{TB4}$, $ACK_{TB5}$, $ACK_{TB6}$, $ACK_{TB7}$, $ACK_{TB8}$, $ACK_{TB9}$, $ACK_{TB10}$}.

The terminal calculates the second bit length to be min ($\lceil \log_2 N \rceil$, $N_1$)=2, and thus the target TBs are TB3 and TB4.

The terminal subtracts the first bit length 10 and the second bit length 2 from the total bit length 22 of the feedback information to determine that the third bit length is 22−10−2=10.

The terminal generates the feedback information according to the first bit length, the second bit length and the third bit length.

There is made such a hypothesis that four code block groups in TB3 are scheduled respectively and the four code block groups in TB3 correspond to feedback response information {$ACK_{TB3\_1}$; $ACK_{TB3\_2}$, $NACK_{TB3\_3}$, $NACK_{TB3\_4}$} respectively. There is made such a hypothesis that two code block groups in TB4 are scheduled respectively and the two code block groups in TB4 correspond to feedback response information {$NACK_{TB4\_1}$, $NACK_{TB4\_2}$} respectively. The 22 bit feedback information generated by the terminal is {$ACK_{TB1}$, $ACK_{TB2}$, $NACK_{TB3}$, $NACK_{TB4}$, $ACK_{TB5}$, $ACK_{TB6}$, $ACK_{TB7}$, $ACK_{TB8}$, $ACK_{TB9}$, $ACK_{TB10}$, 1, 1, $ACK_{TB3\_1}$, $ACK_{TB3\_2}$, $NACK_{TB3\_3}$, $NACK_{TB3\_4}$, $NACK_{TB4\_1}$, $NACK_{TB4\_2}$, 0, 0, 0, 0}, wherein the last four "0s" are reserved.

Second, in a case where $$\sum_{i=1}^{X} N_i^{CBG} > Y,$$

$N_i^{CBG}$ being the number of code block groups in the ith target TB, feedback response information corresponding to different code block groups in at least one target TB is compressed respectively to make $T_i$ after compression meet $$\sum_{i=1}^{X} T_i \leq Y.$$

In at least one exemplary implementation, a compression manner is bit merging.

A determination manner for $T_i$ is not limited in the embodiment of the application. When $T_i$ is larger than the number e of the code block groups in the ith target TB, bits after an eth bit in T are filled with a preset value 1 or 0. And/or, when $T_i$ is smaller than a number of code block groups in the ith target TB, the feedback response information corresponding to different code block groups in the ith target TB is compressed to make the amount of the compressed feedback response information not larger than Ti.

In a schematic example, the access network device makes such a configuration that the total bit length of the feedback information is 22 and each TB maximally includes eight code block groups for the terminal.

The terminal determines that the first bit length of the TB-level feedback response information is 10, and the TB-level feedback response information is:

{$ACK_{TB1}$, $ACK_{TB2}$, $NACK_{TB3}$, $NACK_{TB4}$, $ACK_{TB5}$, $ACK_{TB6}$, $ACK_{TB7}$, $ACK_{TB8}$, $ACK_{TB9}$, $ACK_{TB10}$}.

The terminal calculates the second bit length to be min ($\lceil \log_2 N \rceil$, $N_1$)=2, and thus the target TBs are TB3 and TB4.

The terminal subtracts the first bit length 10 and the second bit length 2 from the total bit length 22 of the feedback information to determine that the third bit length is 22−10−2=10.

The terminal generates the feedback information according to the first bit length, the second bit length and the third bit length.

There is made such a hypothesis that four code block groups in TB3 are scheduled respectively and correspond to feedback response information {$ACK_{TB3\_1}$, $ACK_{TB3\_2}$, $NACK_{TB3\_3}$, $NACK_{TB3\_4}$} respectively. There is made such a hypothesis that eight code block groups in TB4 are scheduled respectively and correspond to feedback response information as follows:

{$ACK_{TB4\_1}$ $ACK_{TB4\_2}$, $NACK_{TB4\_3}$, $NACK_{TB4\_4}$, $NACK_{TB4\_5}$, $NACK_{TB4\_6}$, $NACK_{TB4\_7}$, $NACK_{TB4\_8}$}. Since the number of code block groups in TB3 and TB4 is larger than 10, feedback information compression (bit merging) is required.

A first compression method: only the last TB is compressed. That is, the feedback response information corresponding to TB3 is not compressed, and the 8 bit feedback response information corresponding to TB4 is compressed.

In an example, only the feedback information of first six bits in TB4 is transmitted. The 22 bit feedback information generated by the terminal is {$ACK_{TB1}$, $ACK_{TB2}$, $NACK_{TB3}$, $NACK_{TB4}$, $ACK_{TB5}$, $ACK_{TB6}$, $ACK_{TB7}$, $ACK_{TB8}$, $ACK_{TB9}$, $ACK_{TB10}$, 1, 1, $ACK_{TB3\_1}$, $ACK_{TB3\_2}$, $NACK_{TB3\_3}$, $NACK_{TB3\_4}$, $ACK_{TB4\_1}$, $ACK_{TB4\_2}$, $NACK_{TB4\_3}$, $NACK_{TB4\_4}$, $NACK_{TB4\_5}$, $NACK_{TB4\_6}$}.

In another example, information corresponding to a code block group 5 and code block group 6 in TB4 is merged, information corresponding to a code block group 7 and a code block group 8 is merged and other information is not merged, so as to obtain 6 bit feedback information. The 22 bit feedback information generated by the terminal is {$ACK_{TB1}$, $ACK_{TB2}$, $NACK_{TB3}$, $NACK_{TB4}$, $ACK_{TB5}$, $ACK_{TB6}$, $ACK_{TB7}$, $ACK_{TB8}$, $ACK_{TB9}$, $ACK_{TB10}$, 1, 1, $ACK_{TB3\_1}$, $ACK_{TB3\_2}$, $NACK_{TB3\_3}$, $NACK_{TB3\_4}$, $ACK_{TB4\_1}$, $ACK_{TB4\_2}$, $NACK_{TB4\_3}$, $NACK_{TB4\_4}$, $NACK_{TB4\_5\&6}$, $NACK_{TB4\_7\&8}$}.

In still another example, TB4 is compressed in a unified manner according to a compression ratio of 50%. That is, the information corresponding to a code block group 1 and the code block group 6 is merged, information corresponding to a code block group 3 and a code block group 4 is merged, the information corresponding to the code block group 7 and the code block group 8 is merged, so as to obtain 4 bit feedback information. The 22 bit feedback information generated by the terminal is {$ACK_{TB1}$, $ACK_{TB2}$, $NACK_{TB3}$, $NACK_{TB4}$, $ACK_{TB5}$, $ACK_{TB5}$, $ACK_{TB8}$, $ACK_{TB9}$, $ACK_{TB10}$, 1, 1, $ACK_{TB3\_1}$, $ACK_{TB3\_2}$, $NACK_{TB3\_3}$, $NACK_{TB3\_4}$, $ACK_{TB4\_1\&2}$, $NACK_{TB4\_3\&4}$, $NACK_{TB4\_5\&6}$, $NACK_{TB4\_7\&8}$, 0, 0}, wherein the last two "0s" are reserved.

A second compression method: multiple TBs are compressed. That is, the feedback response information corresponding to TB3 and TB4 is compressed respectively.

The terminal compresses TB3 and TB4 in the unified manner according to the compression ratio of 50%. The terminal may compress the code block group 1 and code block group 2 in TB3 and compress the code block group 3 and code block group 4 in TB3 to obtain 2 bit feedback information, and may compress the information corresponding to the code block group 1 and code block group 6 in TB4, merge the information corresponding to the code block group 3 and code block group 4 in TB4, and merge the information corresponding to the code block group 7 and code block group 8 in TB4 to obtain 4 bit feedback information. The 22 bit feedback information generated by the terminal is {$ACK_{TB1}$, $ACK_{TB2}$, $NACK_{TB3}$, $NACK_{TB4}$, $ACK_{TB5}$, $ACK_{TB6}$, $ACK_{TB8}$, $ACK_{TB9}$, $ACK_{TB10}$, 1, 1, $ACK_{TB3\_1\&2}$, $ACK_{TB3\_3\&4}$, $ACK_{TB4\_1\&2}$, $NACK_{TB4\_3\&4}$, $NACK_{TB4\_5\&6}$, $NACK_{TB4\_7\&8}$, 0, 0, 0, 0}, wherein the last four "0s" are reserved.

According to the method provided in the embodiment, the situation that a length of the code block group-level feedback response information is too large and exceeds the total bit length of the feedback information may be avoided. Therefore, the third bit length occupied by the code block group-level feedback response information may be reasonably controlled according to the total bit length occupied by the feedback information, and the transmission resources occupied by the feedback information are saved.

In an exemplary embodiment, in a case where all bits in the TB-level feedback response information is ACKs, the terminal sets the target TB indication information and the code block group-level feedback response information as reserved information, and the reserved information may be 0 or 1. In at least one exemplary implementation, the terminal sets the other bits except the TB-level feedback response information as the reserved information according to the total bit length of the feedback information.

The embodiment of FIG. 2, the exemplary embodiment based on FIG. 2, the embodiment of FIG. 4 and the exemplary embodiment based on FIG. 4 may be freely combined into other embodiments. However, there are no limits made thereto in the application.

Figure 5:
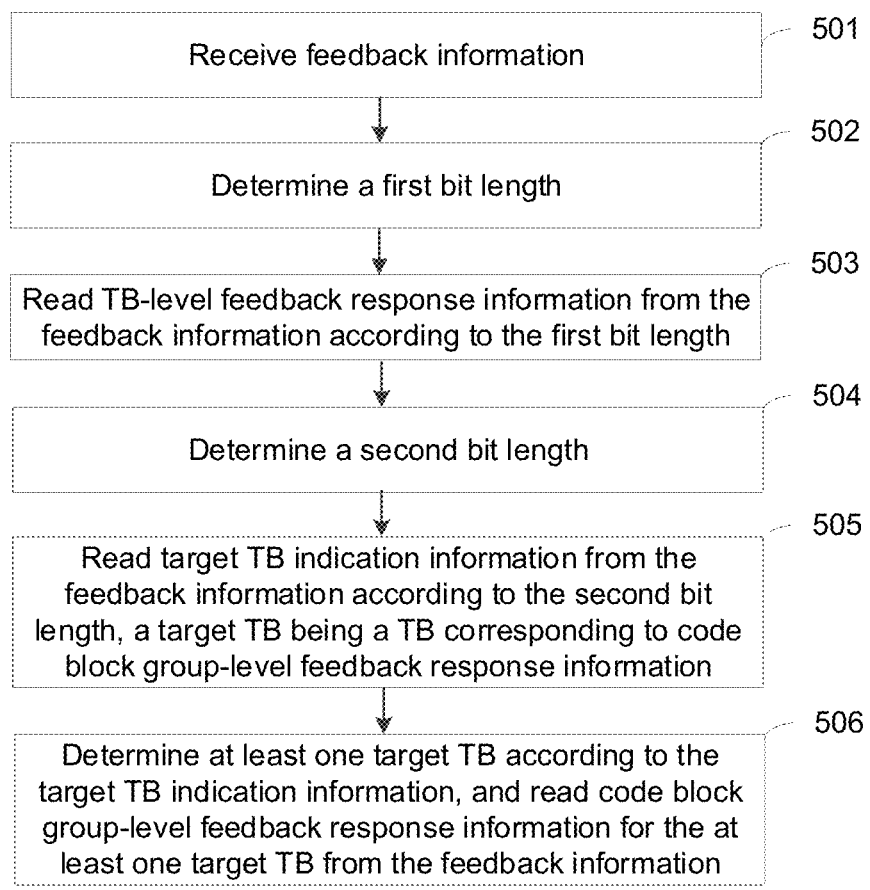
FIG. 5 is a flowchart of a feedback information sending method according to another exemplary embodiment of the application.

Referring to FIG. 5, a flowchart of a feedback information receiving method according to an exemplary embodiment of the application is illustrated. Descriptions will be made in the embodiment with application of the feedback information receiving method to an access network device 120 shown in FIG. 1 as an example. The method includes the following operations shown in blocks 501 to 507 of FIG. 5.

In block 501, feedback information is received.

The access network device sends downlink data to a terminal through a downlink channel. In at least one exemplary implementation, the access network device sends m TBs to the terminal in a HARQ process, m being a positive integer. Each TB includes at least one code block group. The number of code blocks in each TB is the same or different.

In block 502, a first bit length is determined.

The first bit length is a number of bits for representing TB-level feedback response information.

The access network device determines the first bit length according to the number m of the TBs transmitted this time. In at least one exemplary implementation, the access network device determines that the first bit length is equal to m.

In block 503, TB-level feedback response information is read from the feedback information according to the first bit length.

The access network device reads first m bits from the feedback information, the first m bits being the TB-level feedback response information. An ith bit in the TB-level feedback response information is feedback response information for an ith TB. The feedback response information includes an ACK and a NACK. The ACK represents that the TB is correctly received by the terminal, and the ACK may be one bit whose value is 1. The NACK represents that the TB is not correctly received by the terminal, and the NACK may be one bit whose value is 0.

The access network device, after reading the TB-level feedback response information, determines the number of NACKs in the TB-level feedback response information.

In block 504, a second bit length is determined.

The second bit length is a number of bits for representing target TB indication information.

In at least one exemplary implementation, the above mentioned target TB is at least one TB corresponding to code block group-level feedback response information. When a TB fails to be received, the terminal is required to feed back code block group-level feedback response information for the TB failed to be received.

Since a total bit length which may be used for feedback information is limited, the terminal may generate the code block group-level feedback response information for all of or part of the TBs failed to be received.

The above mentioned is at least one TB corresponding to the code block group-level feedback response information. In a case where the TB-level feedback response information includes NACKs for n TBs, the above mentioned target TB is at least one TB in the n TBs.

The target TB indication information is used for indicating at least one target TB for which the code block group-level feedback response information is fed back. In at least one exemplary implementation, the target TB indication information indicates the at least one target TB in the n TBs in a bitmap manner.

In block 505, target TB indication information is read from the feedback information according to the second bit length, a target TB being a TB corresponding to code block group-level feedback response information.

The access network device reads (m+1)th to (m+s)th bits from the feedback information, the (m+1)th to (m+s)th bits being the target TB indication information.

In block 506, at least one target TB is determined according to the target TB indication information.

The access network device, after reading the target TB indication information, determines the at least one target TB according to the target TB indication information.

In block 507, code block group-level feedback response information for the at least one target TB is read from the feedback information.

The access network device may read code block group-level feedback response information for each target TB from remaining bits, except a first bit, in the feedback information.

From the above, according to the method provided in the embodiment, the first bit length is determined, the TB-level feedback response information is read from the feedback information according to the first bit length, the second bit length is determined, the target TB indication information is read from the feedback information according to the second bit length, the at least one target TB is determined according to the target TB indication information, and the code block group-level feedback response information for the at least one target TB is read from the feedback information. Then, the access network device may determine a code block which fails to be received according to the code block group feedback response information, only retransmits the code block which fails to be received, and is not required to retransmit the whole TB. Therefore, occupied time-frequency resources are reduced, and downlink data transmission efficiency is improved.

The access network device adopts a manner the same as that adopted by the terminal to determine the second bit length. That is, there may be at least three possible implementation modes for the operation in block 504.

First, the second bit length is determined according to the first bit length.

In an embodiment, the access network device determines that the second bit length is equal to a first numerical value, the first numerical value being $\lceil \log_2 N \rceil$ or $\lfloor \log_2 N \rfloor$ or $\lceil \beta \cdot N \rceil$ or $\lfloor \beta \cdot N \rfloor$, $\lceil \ \rceil$ being a rounding-up signal and $\lfloor \ \rfloor$ being a rounding-down signal, where $\beta$ is a positive value less than 1 and N is the first bit length.

For example, in a case where the first bit length is 10 bits and the first numerical value is equal to $\lceil \log_2 10 \rceil = 4$, the second bit length is determined to be equal to 4. For another example, the first bit length is 10 bits, $\beta = 0.2$ and the first numerical value is equal to $\lceil 0.1 \ast 10 \rceil = 2$.

In another embodiment, the access network device determines that the second bit length is equal to a smaller value in the first numerical value and a first threshold value. The first threshold value may be pre-configured or pre-determined. In at least one exemplary implementation, the access network device sends first configuration signaling to the terminal, the first configuration signaling being used for configuring the first threshold value for the terminal.

For example, in a case where the first bit length is 10 bits, the first numerical r value is equal to $\lceil \log_2 N \rceil = 4$ and the first threshold value is $N_1 = 2$, the second bit length is determined to be equal to $\min(\lceil \log_2 N \rceil, N_1) = 2$.

Second, the second bit length is determined according to the number of NACKs in the TB-level feedback response information.

In an embodiment, the access network device determines that the second bit length is equal to a second numerical value, the second numerical value being the number of the NACKs in the TB-level feedback response information.

For example, in a case where the first bit length is 10 bits, feedback response information for four TBs is NACKs and the second numerical value is equal to 4, the access network device determines that the second bit length is 4.

In another embodiment, the access network device determines that the second bit length is equal to a smaller value in the second numerical value and a second threshold value. The second threshold value may be pre-configured or pre-determined. In at least one exemplary implementation, the access network device sends second configuration signaling to the terminal, the second configuration signaling being used for configuring the second threshold value for the terminal.

For example, in a case where the first bit length is 10 bits, the feedback response information for four TBs is the NACKs, the second numerical value is equal to 4 and the second threshold value is $N_2 = 2$, the second bit length is determined to be $\min(4, N_2) = 2$.

Third, the second bit length is determined according to the first bit length and the number of the NACKs in the TB-level feedback response information.

In an embodiment, the access network device determines that the second bit length is equal to a smaller value in a third numerical value and a second numerical value. Herein, the third numerical value is $\lceil \log_2 N \rceil$ or $\lfloor \log_2 N \rfloor$ $\lceil \beta \cdot N \rceil$ or $\lfloor \beta \cdot N \rfloor$, , where $\beta$ is a positive value less than 1, N is the first bit length and the second numerical value is the number of the NACKs in the TB-level feedback response information.

For example, in a case where the first bit length is 10 bits, the third numerical value is equal to $\lceil \log_2 10 \rceil = 4$, the number of the NACKs in the TB-level feedback response information is 4 and the second numerical value is also 4, the second bit length is equal to $\min(\lceil \log_2 10 \rceil, 4) = 4$.

In another embodiment, the access network device determines that the second bit length is equal to a smaller value in the third numerical value and a third threshold value. The third threshold value may be pre-configured or pre-determined. In at least one exemplary implementation, the access network device sends third configuration signaling to the terminal, the third configuration signaling being used for configuring the third threshold value for the terminal.

For example, in a case where the first bit length is 10 bits, the third numerical value is equal to $\lceil \log_2 10 \rceil = 4$ and the third threshold value is $N_3 = 2$, the second bit length is determined to be equal to $\min(\lceil \log_2 10 \rceil, N_3) = 2$.

In an exemplary embodiment based on FIG. 5, the operation in block 506 may include at least one of the following two sub-operations.

First, when the second bit length is less than or equal to the number of the NACKs in the TB-level feedback response information, it is determined according to the target TB indication information that first P TBs or last P TBs corresponding to the NACKs in the TB-level feedback response information are target TBs. Herein, P is the second bit length.

For example, when the TBs include TB1 to TB10, the TB-level feedback response information is $\{ACK_{TB1}, ACK_{TB2}, ACK_{TB3}, ACK_{TB4}, NACK_{TB5}, NACK_{TB6}, NACK_{TB7}, NACK_{TB8}, ACK_{TB9}, ACK_{TB10}\}$ and the second bit length is 2, the access network device determines according to the target TB indication information that first two TBs, i.e., TB5 and TB6 corresponding to the NACKs are target TBs, that is, the feedback information contains code block group-level feedback response information for TB5 and TB6.

For another example, when the TBs include TB1 to TB8, the TB-level feedback response information is {$ACK_{TB1}$, $ACK_{TB2}$, $ACK_{TB3}$, $ACK_{TB4}$, $NACK_{TB5}$, $NACK_{TB6}$, $NACK_{TB7}$, $NACK_{TB8}$} and the second bit length is 3, the target TB indication information is used for indicating that last three TBs, i.e., TB6, TB7 and TB8 corresponding to the NACKs are target TBs, that is, the feedback information contains code block group-level feedback response information for TB6, TB7 and TB8.

Second, when the second bit length is larger than the number of the NACKs in the TB-level feedback response information, it is determined according to first Q bits in the target TB indication information that all TBs corresponding to the NACKs in the TB-level feedback response information are target TBs. Herein, Q is the number of the NACKs in the TB-level feedback response information.

For example, when the TBs include TB1 to TB10, the TB-level feedback response information is {$ACK_{TB1}$, $ACK_{TB2}$, $ACK_{TB3}$, $ACK_{TB4}$, $NACK_{TB5}$, $NACK_{TB6}$, $ACK_{TB7}$, $ACK_{TB8}$, $ACK_{TB9}$, $ACK_{TB10}$} and the second bit length is 4, first two bits in four bits of the target TB indication information are used for indicating TB5 and TB6 corresponding to the NACKs are target TBs, that is, the feedback information contains the code block group-level feedback response information for TB5 and TB6.

Figure 6:
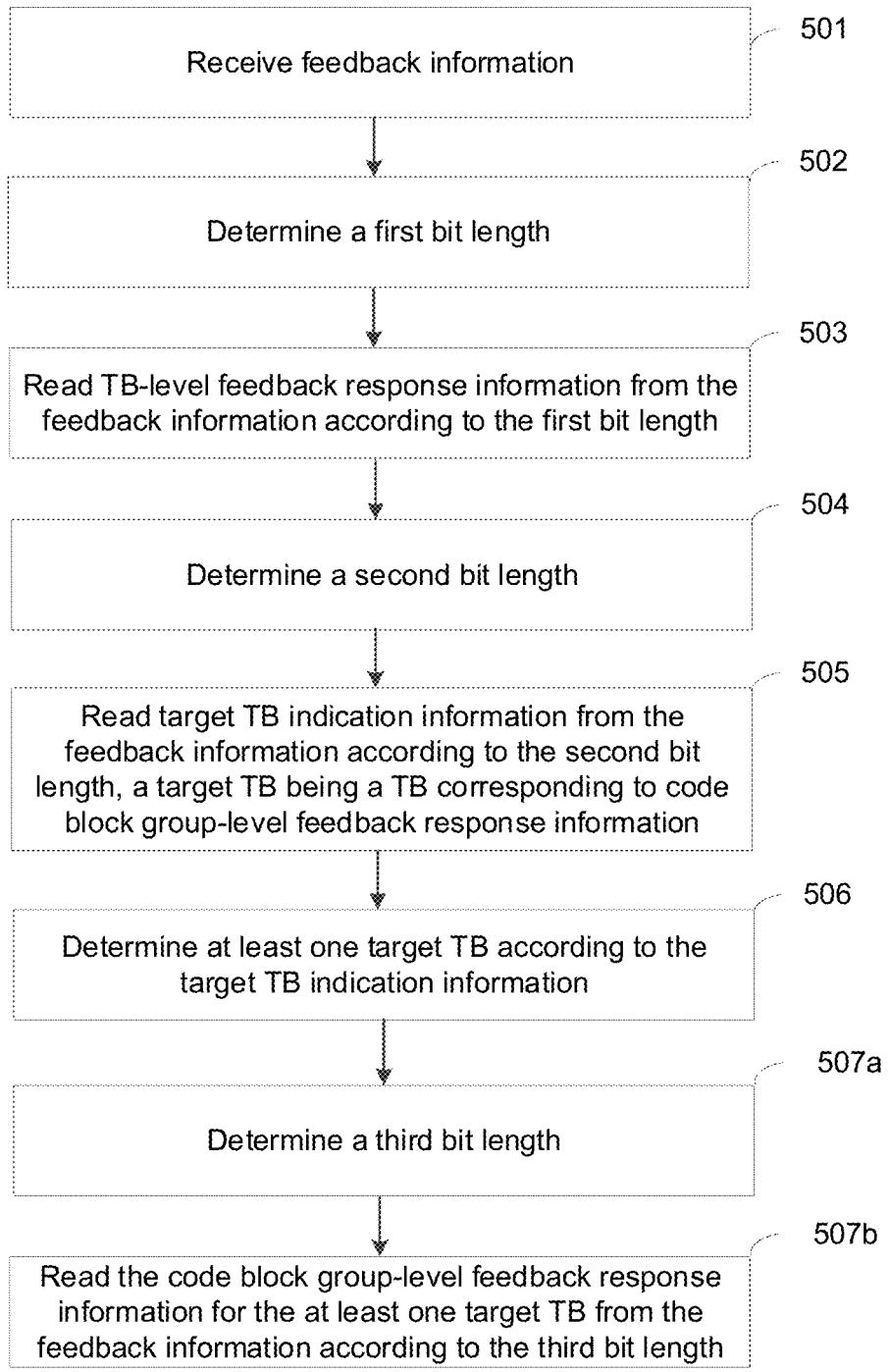
FIG. 6 is a flowchart of a feedback information sending method according to another exemplary embodiment of the application.

As shown in FIG. 6, in an exemplary embodiment based on FIG. 5, the operation in block 507 may include the following two sub-operations shown in blocks 507a and 507b of FIG. 6.

In block 507a, a third bit length is determined.

The access network device determines the third bit length according to a total bit length of the feedback information, the first bit length and the second bit length. For example, the first bit length and the second bit length are subtracted from the total bit length of the feedback information to obtain a remaining bit length, and the remaining bit length is determined as the third bit length.

In at least one exemplary implementation, the access network device sends downlink control signaling or high-layer signaling to the terminal in advance, the downlink control signaling or the high-layer signaling being used for indicating the total bit length of the feedback information to the terminal.

In block 507b, the code block group-level feedback response information for the at least one target TB is read from the feedback information according to the third bit length.

In at least one exemplary implementation, the access network device reads a remaining bit sequence, except the TB-level feedback response information and the target TB indication information, in the feedback information to obtain the code block group-level feedback response information for each target TB.

Figure 7:
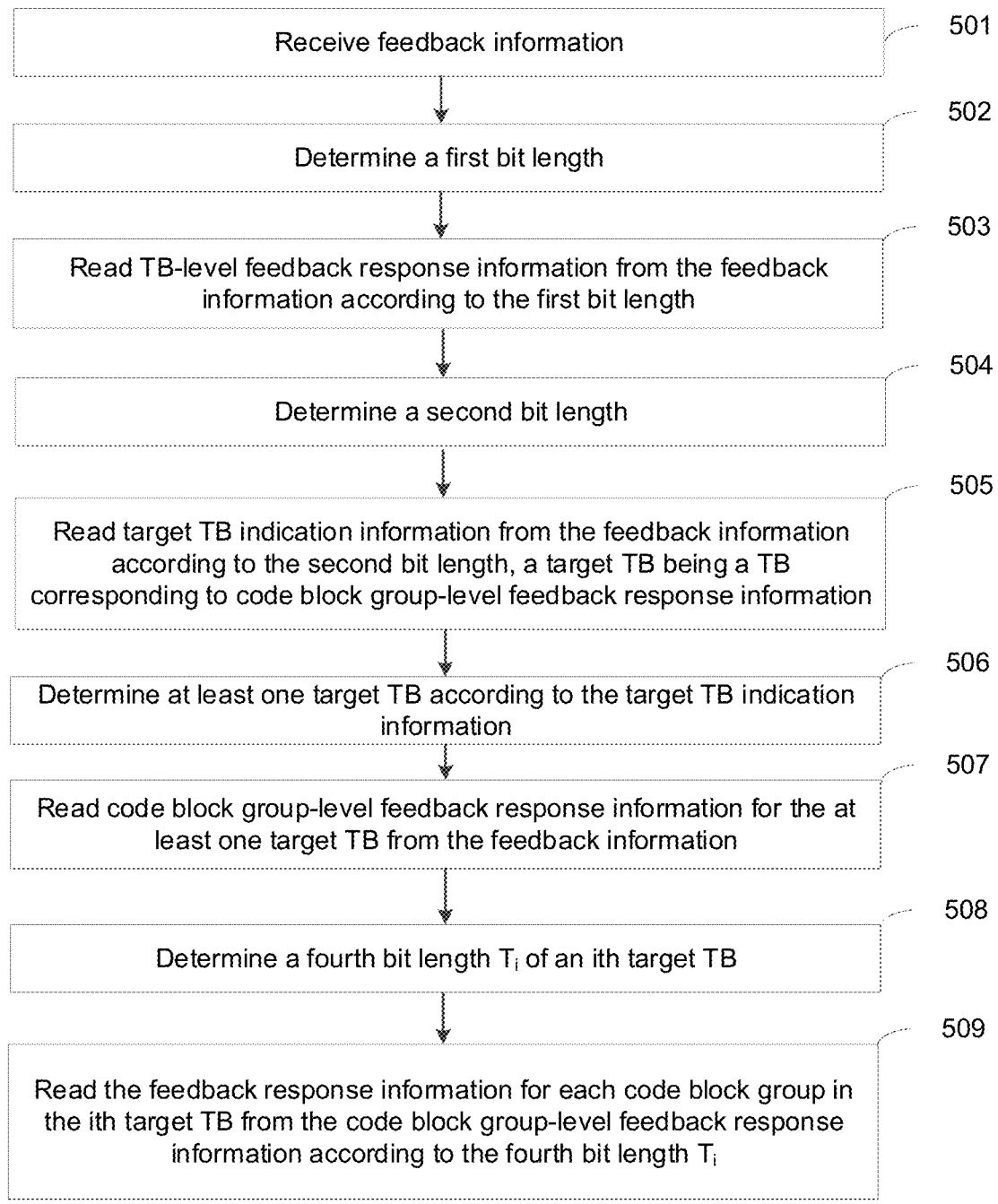
FIG. 7 is a flowchart of a feedback information sending method according to another exemplary embodiment of the application.

In an exemplary embodiment based on FIG. 5, the access network device, after reading the whole code block group-level feedback information, further reads the code block group-level feedback response information for single target TBs respectively. That is, as shown in FIG. 7, the following operations shown in blocks 508 and 509 of FIG. 7 are further included after the operation in block 507.

In block 508, a fourth bit length $T_i$ of an ith target TB is determined, $T_i$ being greater than or equal to 1, and X is a number of the at least one target TB.

In at least one exemplary implementation, the access network device determines that $T_i$ is equal to a maximum number of code block groups in one TB, or determines that $T_i$ is equal to a number of code block groups in the ith target TB, or determines that $T_i$ is equal to a third numerical value, the third numerical value being determined according to the third bit length.

In an exemplary implementation mode, the operation that the access network device determines that $T_i$ is equal to the third numerical value includes:

$$T_X = Y - \sum_{i=1}^{X-1} T_i,$$

where Tx is a bit length corresponding to feedback response information for each code block group in an Xth target TB and Y is the third bit length.

Or, in a case where $$\sum_{i=1}^{X} N_i^{CBG} > Y,$$

$N_i^{CBG}$ being the number of code block groups in the ith target TB, $T_i$ is determined in a manner of compressing feedback response information corresponding to each code block group in all or part of the target TBs to make $T_i$ meet $$\sum_{i=1}^{X} T_i \leq Y.$$

In block 509, the feedback response information for each code block group in the ith target TB is read from the code block group-level feedback response information according to the fourth bit length Ti.

The operation may include at least one of the following operations.

When $T_i$ is equal to a number of code block groups in the ith target TB, $T_i$ bits are sequentially read from the code block group-level feedback response information as the feedback response information for each code block group in the ith target TB. In at least one exemplary implementation, a jth bit in the $T_i$ bits is used for indicating the feedback response information for a jth code block group.

When $T_i$ is larger than the number s of the code block groups in the ith target TB, first s bits in $T_i$ bits are sequentially read from the code block group-level feedback response information as the feedback response information for each code block group in the ith target TB. In at least one exemplary implementation, a jth bit in the s bits is used for indicating the feedback response information for the jth code block group.

When $T_i$ is smaller than a number of code block groups in the ith target TB, $T_i$ bits is sequentially read from the code block group-level feedback response information as compressed feedback response information for the ith target TB; and the feedback response information for each code block in the ith target TB is determined according to the compressed feedback response information.

After the feedback response information for each code block group in the ith target TB is read, the access network device may only retransmit a code block group corresponding to a NACK, so that a bit length occupied by the HARQ process is reduced.

In an exemplary embodiment, in a case where all the bits in the TB-level feedback response information are ACKs, the access network device discards the other bits, except the TB-level feedback response information in the feedback information.

The embodiment of FIG. 5, the exemplary embodiment based on FIG. 5, the embodiment of FIG. 6, the exemplary embodiment based on FIG. 6, the embodiment of FIG. 7 and the exemplary embodiment based on FIG. 7 may be freely combined into other embodiments. However, there are no limits made thereto in the application.

A specific implementation solution adopted when the access network device determines each bit length and/or the compression manner is completely the same as or corresponds to a specific implementation solution adopted by the terminal. The access network device and the terminal may predetermine the bit length and/or the compression manner or configure the bit length and/or the compression manner according to configuration signaling. There are no limits made thereto in the application.

Figure 8:
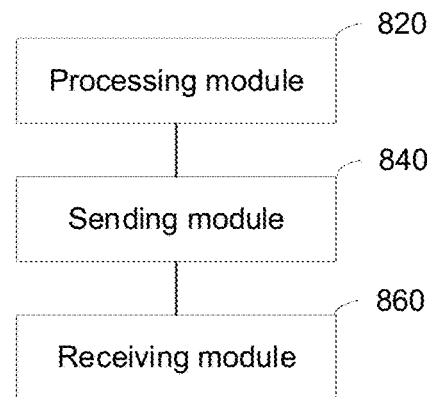
FIG. 8 is a block diagram of a feedback information sending device according to another exemplary embodiment of the application.

Referring to FIG. 8, a structure diagram of a feedback information sending device according to an exemplary embodiment of the application is illustrated. As shown in FIG. 8, the feedback information sending device includes a processing module 820, a sending module 840 and a receiving module 860.

The processing module 820 is configured to implement at least one operation of a determination operation, a calculation operation and a reading operation and all other operations except a sending operation and a receiving operation on a terminal side in the method embodiment. The sending module 840 is configured to implement the sending operation on the terminal side in the method embodiment. The receiving module 860 is configured to implement the receiving operation on the terminal side in the method embodiment. Herein, the processing module 820 may be implemented by executing, by a processor, a code in a memory, the sending module 840 may be implemented by executing the code, by a sender, in the memory and the receiving module 860 may be implemented by executing, by a receiver, a code in the memory. In at least one exemplary implementation, the sender and the receiver may be integrated into the same communication chip.

Figure 9:
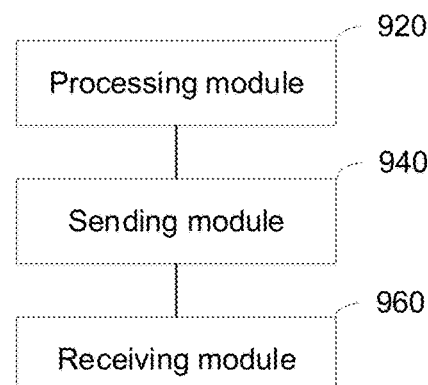
FIG. 9 is a block diagram of a feedback information receiving device according to another exemplary embodiment of the application.

Referring to FIG. 9, a structure diagram of a feedback information sending device according to an exemplary embodiment of the application is illustrated. As shown in FIG. 9, the feedback information sending device includes a processing module 920, a sending module 940 and a receiving module 960.

The processing module 920 is configured to implement at least one operation of a determination operation, a calculation operation and a reading operation and all other operations except a sending operation and a receiving operation on an access network device side in the method embodiment. The sending module 940 is configured to implement the sending operation on the access network device side in the method embodiment. The receiving module 960 is configured to implement the receiving operation on the access network device side in the method embodiment. Herein, the processing module 920 may be implemented by executing, by a processor, a code in a memory, the sending module 940 may be implemented by executing the code, by a sender, in the memory and the receiving module 960 may be implemented by executing, by a receiver, a code in the memory. In at least one exemplary implementation, the sender and the receiver may be integrated into the same communication chip.

Figure 10:
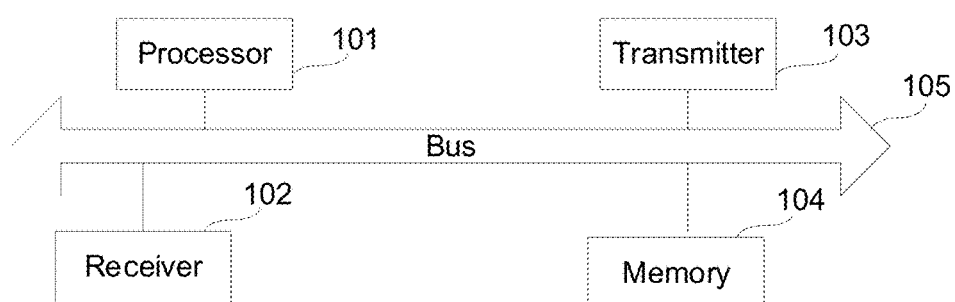
FIG. 10 is a structure block diagram of a terminal according to another exemplary embodiment of the application.

Referring to FIG. 10, a structure diagram of a terminal according to an exemplary embodiment of the application is illustrated. The terminal includes a processor 101, a receiver 102, a transmitter 103, a memory 104 and a bus 105.

The processor 101 includes one or more than one processing core, and the processor 101 runs a software program or a module, thereby executing various functional applications and information processing.

The receiver 102 and the transmitter 103 may be implemented into a communication component, and the communication component may be a communication chip.

The memory 104 is connected with the processor 101 through the bus 105.

The memory 104 may be configured to store at least one instruction, and the processor 101 is configured to execute the at least one instruction to implement each operation in the method embodiment.

In addition, the memory 104 may be implemented by any type of volatile or non-volatile storage devices or a combination thereof, and the volatile or non-volatile storage devices include, but not limited to, a magnetic disk or an optical disk, an Electrically Erasable Programmable Read-Only Memory (EEPROM), an Erasable Programmable Read-Only Memory (EPROM), a Static Random Access Memory (SRAM), a Read-Only Memory (ROM), a magnetic memory, a flash memory and a Programmable Read-Only Memory (PROM).

Figure 11:
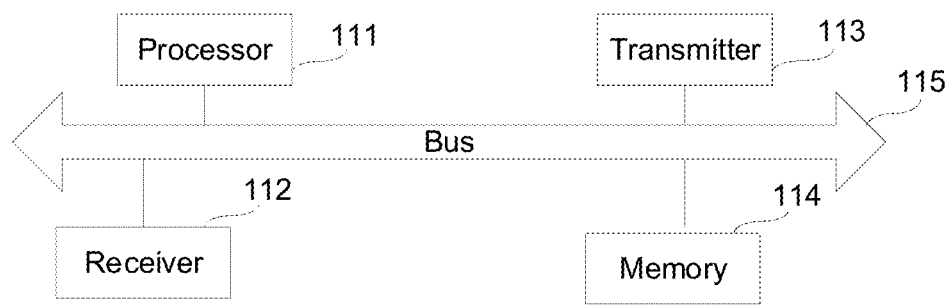
FIG. 11 is a structure block diagram of a terminal according to another exemplary embodiment of the application.

Referring to FIG. 11, a structure diagram of an access network device according to an exemplary embodiment of the application is illustrated. The access network device includes a processor 111, a receiver 112, a transmitter 113, a memory 114 and a bus 115.

The processor 1 includes one or more than one processing core, and the processor 111 runs a software program or a module, thereby executing various functional applications and information processing.

The receiver 112 and the transmitter 113 may be implemented into a communication component, and the communication component may be a communication chip.

The memory 114 is connected with the processor 111 through the bus 115.

The memory 114 may be configured to store at least one instruction, and the processor 111 is configured to execute the at least one instruction to implement each operation in the method embodiment.

In addition, the memory 114 may be implemented by any type of volatile or non-volatile storage devices or a combination thereof, and the volatile or non-volatile storage devices include, but not limited to, a magnetic disk or an optical disk, an EEPROM, an EPROM, an SRAM, a ROM, a magnetic memory, a flash memory and a PROM.

The application provides a computer-readable storage medium, in which at least one instruction is stored, the at least one instruction being loaded and executed by a processor to implement the feedback information sending method and/or feedback information receiving method provided in each method embodiment.

The application also provides a computer program product, which runs on a computer to enable the computer to execute the feedback information sending method and/or feedback information receiving method provided in each method embodiment.

Those skilled in the art should know that, in the one or more examples, functions described in the embodiments of the application may be realized by hardware, software, firmware or any combination thereof. During implementation with the software, these functions may be stored in a computer-readable medium or transmitted as one or more instructions or codes on the computer-readable medium. The computer-readable medium includes a computer storage medium and a communication medium. Herein, the communication medium includes any medium transmitting a computer program from a place to another place. The storage medium may be any available medium accessible to a universal or dedicated computer.

The above is only the preferred embodiment of the application and not intended to limit the application. Any modifications, equivalent replacements, improvements and the like made within the spirit and principle of the application shall fall within the scope of protection of the application.

What is claimed is:

1. A feedback information sending method, comprising:
   determining a first bit length, the first bit length being a number of bits for representing Transport Block (TB)-level feedback response information;
   determining a second bit length, the second bit length being a number of bits for representing target TB indication information;
   generating feedback information according to the first bit length and the second bit length, the feedback information comprising the TB-level feedback response information, the target TB indication information and code block group-level feedback response information; and
   sending the feedback information;
   wherein the target TB indication information is used for indicating at least one target TB corresponding to the code block group-level feedback response information.

2. The method as claimed in claim 1, wherein
   the TB-level feedback response information comprises Non-Acknowledges (NACKs) for n TBs, n being a positive integer; and
   at least one target TB indicated by the target TB indication information is at least one TB in the n TBs.

3. The method as claimed in claim 1, wherein determining the second bit length comprises:
   determining the second bit length according to the first bit length.

4. The method as claimed in claim 3, wherein determining the second bit length according to the first bit length comprises:
   determining that the second bit length is equal to a first numerical value, the first numerical value being $\lceil \log_2 N \rceil$ or $\lfloor \log_2 N \rfloor$ or $\lceil \beta \cdot N \rceil$ or $\lfloor \beta \cdot N \rfloor$, where $\beta$ is a positive value less than I and N is the first bit length;
   or,
   determining that the second bit length 1s equal to a smaller value m the first numerical value and a first threshold value.

5. The method as claimed in claim 1, wherein determining the second bit length comprises:
   determining the second bit length according to a number of Non-Acknowledges (NACKs) in the TB-level feedback response information.

6. The method as claimed in claim 5, wherein determining the second bit length according to the number of the NACKs in the TB-level feedback response information comprises:
   determining that the second bit length is equal to a second numerical value, the second numerical value being the number of the NACKs in the TB-level feedback response information;
   determining that the second bit length is equal to a smaller value in the second numerical value and a second threshold value.

7. The method as claimed in claim 1, wherein determining the second bit length comprises:
   determining the second bit length according to the first bit length and a number of Non-Acknowledges (NACKs) in the TB-level feedback response information.

8. The method as claimed in claim 7, wherein determining the second bit length according to the first bit length and the number of the NACKs in the TB-level feedback response information comprises:
   determining that the second bit length is equal to a smaller value in a third numerical value and a second numerical value;
   or,
   determining that the second bit length 1s equal to a smaller value m the third numerical value and a third threshold value,
   the third numerical value being $\lceil \log_2 N \rceil$ or $\lfloor \log_2 N \rfloor$ or $\lceil \beta \cdot N \rceil$ or $\lfloor \beta \cdot N \rfloor$, where $\beta$ is a positive value less than I and N is the first bit length, and the second numerical value being the number of the NACKs in the TB-level feedback response information.

9. The method as claimed in claim 2, wherein
   when the second bit length is less than or equal to a number of the NACKs in the TB-level feedback response information, the target TB indication information is used for indicating that first P TBs or last P TBs corresponding to the NACKs in the TB-level feedback response information are target TBs,
   P being the second bit length.

10. The method as claimed in claim 2, wherein
    when the second bit length is larger than a number of the NACKs in the TB-level feedback response information, first Q bits in the target TB indication information are used for indicating that the TBs corresponding to the NACKs in the TB-level feedback response information are target TBs,
    Q being the number of the NACKs in the TB-level feedback response information.

11. The method as claimed in claim 1, before generating the feedback information according to the first bit length and the second bit length, further comprising:
    determining a third bit length, the third bit length being a bit length corresponding to the code block group-level feedback response information, wherein
    generating the feedback information according to the first bit length and the second bit length comprises:
    generating the feedback information according to the first bit length, the second bit length and the third bit length.

12. The method as claimed in claim 11, wherein determining the third bit length comprises:
    determining the third bit length according to a total bit length of the feedback information;
    or,
    receiving configuration signaling sent by a network-side device, and determining the third bit length according to the configuration signaling.

13. The method as claimed in claim 12, wherein determining the third bit length according to the total bit length of the feedback information comprises:

determining the total bit length of the feedback information according to downlink control signaling, and determining the third bit length according to the total bit length, the first bit length and the second bit length;

or, determining the total bit length of the feedback information according to high-layer signaling, and determining the third bit length according to the total bit length, the first bit length and the second bit length.

14. The method as claimed in claim 1, further comprising:

determining a fourth bit length Ti of an ith target TB, Ti being greater than or equal to 1, 1≤i≤X and X is a number of at least one target TB indicated by the target TB indication information indicated by the target TB indication information; and generating feedback response information for each code block group in the ith target TB according to the fourth bit length Ti.

15. The method as claimed in claim 14, wherein determining the fourth bit length Ti of the ith target TB comprises:

determining that Ti is equal to a maximum number of code block groups in one TB;

or, determining that Ti is equal to a number of code block groups in the ith target TB;

or, determining that Ti is equal to a third numerical value, the third numerical value being determined according to a third bit length, the third bit length being a bit length corresponding to the code block group-level feedback response information.

16. The method as claimed in claim 15, wherein determining the fourth bit length Ti of the ith target TB comprises:

setting $$T_X = Y - \sum_{i=1}^{X-1} T_i,$$

where Tx is a bit length corresponding to an Xth target TB, and Y is the third bit length;

or, in a case where $$\sum_{i=1}^{X} N_i^{CBG} > Y,$$

$N_i^{CBG}$ being the number of code block groups in the ith target TB, determining Ti in a manner of compressing feedback response information corresponding to each code block group in all or part of the target TBs to make Ti meet $$\sum_{i=1}^{X} T_i \le Y.$$

17. The method as claimed in claim 14, wherein generating the feedback response information for each code block group in the ith target TB according to the fourth bit length Ti comprises:

when Ti is smaller than a number of code block groups in the ith target TB, compressing the feedback response information corresponding to each code block group in the ith target TB to obtain compressed feedback response information, a volume of the compressed feedback response information being not larger than Ti.

18. A feedback information sending device, comprising:
a processor; and
a memory, the memory storing at least one instruction which is to be executed by the processor to implement the following steps:

determining a first bit length, the first bit length being a number of bits for representing Transport Block (TB)-level feedback response information;

determining a second bit length, the second bit length being a number of bits for representing target TB indication information;

generating feedback information according to the first bit length and the second bit length, the feedback information comprising the TB-level feedback response information, the target TB indication information and code block group-level feedback response information; and sending the feedback information;

wherein the target TB indication information is used for indicating at least one target TB corresponding to the code block group-level feedback response information.

19. A feedback information receiving device, comprising:
a processor; and
a memory, the memory storing at least one instruction which is to be executed by the processor to implement the following steps:

receiving feedback information;

determining a first bit length;

reading Transport Block (TB)-level feedback response information from the feedback information according to the first bit length;

determining a second bit length;

reading target TB indication information from the feedback information according to the second bit length; and determining at least one target TB according to the target TB indication information, and reading code block group-level feedback response information of the at least one target TB from the feedback information;

wherein the target TB indication information is used for indicating the at least one target TB corresponding to the code block group-level feedback response information.

* * * * *